United States Patent Office 3,236,890
Patented Feb. 22, 1966

---

3,236,890
2-BENZOYL-3,4,5,6-TETRA-BROMO- AND CHLORO-ANILINES
Benjamin Pecherer, Montclair, N.J., assignor to Hoffmann-La Roche Inc., Nutley, N.J., a corporation of New Jersey
No Drawing. Filed Mar. 28, 1963, Ser. No. 268,567
2 Claims. (Cl. 260—570)

This invention relates to the preparation of tetrahaloaniline derivatives; and more particularly relates to 2-benzoyl-3,4,5,6-tetrahaloanilines.

The 2-benzoyl-3,4,5,6-tetrahaloanilines of the invention have the formula:

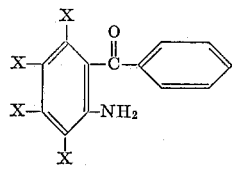

(I)

wherein X is chlorine or bromine.

The tetrahaloanilines of Formula I are useful as intermediates in the preparation of 1,2,3,4,7,8,9,10-octahalo-6,12-diphenyldibenzo[b,f][1,5]diazocines, wherein the halogen is bromine or chlorine. These diazocines have antigonadotropic activity, and are useful as antigonadotropins. They are prepared from the tetrahaloanilines of the invention by reacting a tetrahaloaniline or Formula I in the presence of boron fluoride ethyl ether and titanium tetrachloride in chlorobenzene. However, it is to be understood that the diazocines and the method for their preparation are given for purposes of completeness only and do not comprise part of the invention disclosed and claimed herein.

Additionally, the tetrahaloanilines of this invention can be converted to diazonium salts by dissolving them in concentrated sulfuric acid and adding to the solution a stoichiometric quantity of sodium nitrate. The diazonium salts are then coupled in carbonate solution with naphthols containing sulfonic acid or carboxylic acid groups, for example, 2-hydroxy-3,6-disulfonic acid or 2-hydroxy-3-naphthoic acid. The resulting azo compounds are colored orange to brown and can be used to dye wool and silk using known dyeing techniques.

The tetrahaloanilines of the invention are prepared by treating a 2-benzoyl-3,4,5,6-tetrahalobenzoic acid with an inorganic acid halide, e.g., thionyl chloride, phosphorus trichloride, phosphorus pentachloride, phosphorus tribromide, etc., to form a 3,4,5,6-tetrahalobenzoyl halide. The latter compound is then treated with ammonia, preferably in aqueous form, to give 2-benzoyl-3,4,5,6-tetrahalobenzamide. The benzamide is then dissolved in a lower alkanol, e.g., methanol, ethanol, etc., and treated with an aqueous alkaline hypohalite solution, for example, an alkali metal hydroxide-alkali or alkaline earth metal hypohalite solution, e.g., potassium hydroxide-sodium hypochlorite solution to yield 2-carboloweralkoxyamino-3,4,5,6-tetrahalobenzophenone. The latter compound is then isolated from the reaction mixture, preferably by neutralization of the reaction mixture with an acid, e.g., acetic acid, followed by removal of the excess lower alkanol, e.g., by distillation, followed by precipitation of the 2-carboloweralkoxyamino-3,4,5,6-tetrahalobenzophenone, e.g., by adding water to the residue and chilling. The isolated compound is hydrolyzed with an aqueous alkali metal hydroxide, e.g., potassium hydroxide, to yield the 2-benzoyl-3,4,5,6-tetrahaloaniline of the invention.

Alternatively, the 2-benzoyl-3,4,5,6-tetrahalobenzamide can be treated with an aqueous alkaline hypohalite solution, followed by the addition of aqueous alkali metal hydroxide to the reaction mixture to yield the 2-benzoyl-3,4,5,6-tetrahaloaniline directly without isolation of the intermediate 2-carboalkoxyamino-3,4,5,6-tetrahalobenzophenone.

Example 1

85 g. of 2-benzoyl-3,4,5,6-tetrachlorobenzoic acid is suspended in 170 ml. of thionyl chloride in a flask equipped with a stirrer and reflux condenser, and connected to a gas scrubbing system. After heating and stirring for ½ hour on a steam bath, the solid dissolves, but little gas evolution occurs. Upon the addition of a few drops of dimethylformamide, vigorous evolution of sulfur dioxide and hydrogen chloride takes place. After heating for an hour, the mixture is cooled and 250 ml. of petroleum ether (B.P. 60–90° C.) is added, whereupon crystalline 2-benzoyl-3,4,5,6-tetrachlorobenzoyl chloride separates. After chilling in an ice bath for an hour, the crystals are filtered off and washed with petroleum ether. The product weighs 75 g. and has a melting point of 184–185° C.

The 75 g. of 2-benzoyl-3,4,5,6-tetrachlorobenzoyl chloride is stirred for 18 hours in a mixture of 4 l. of ethyl alcohol and 4 l. of concentrated ammonium hydroxide. The solid is then filtered off, the filtrate diluted with 4 l. of water and the precipitate that forms added to the originally obtained filter cake. The filter cake, which is 2-benzoyl-3,4,5,6-tetrachlorobenzamide, melts at 260–265° C., after washing well with water and drying. After recrystallization from 8 l. to 60 percent aqueous alcohol, 60 g. of crystalline product is obtained melting at 270–274° C. Upon further recrystallization, the melting point is 272–274° C.

In a flask equipped with a stirrer, thermometer and reflux condenser is placed 58 g. of 2-benzoyl-3,4,5,6-tetrachlorobenzamide, 58 g. of potassium hydroxide dissolved in 2800 ml. of methanol, and 105 ml. of sodium hypochlorite solution, assaying 16.8 percent active chlorine. The stirred suspension is warmed to 45–50° C., and maintained at this temperature for about 10 minutes. Then the solution is refluxed for 1 hour, 58 ml. of glacial acetic acid is added, the condenser is changed for downward distillation, and 2 l. of methanol distilled off. One l. of water is added to the residue and the mixture is chilled. The resulting yellow solid is filtered off, washed well with water, and dried in vacuo over calcium chloride to yield 61 g. of 2-carbomethoxyamino-3,4,5,6-tetrachlorobenzophenone of melting point 200–204° C. Upon recrystallization from acetic acid, the product is obtained in the form of bright yellow needles melting at 207–208° C.

61 g. of 2-carbomethoxyamino-3,4,5,6-tetrachlorobenzophenone is added to a solution of 183 g. of potassium hydroxide in 2 l. of methanol and 1 l. of water in a flask equipped with a stirrer and condenser set for downward distillation. The solution is heated, methanol distills out, and a crystalline yellow precipitate forms. Distillation is continued until the vapor temperature reaches 98° C. The residue is then chilled, and the yellow precipitate is filtered off and washed free of alkali with water. The dry 2-benzoyl-3,4,5,6-tetrachloroaniline melts at 172–177° C. and weighs 52 g. Upon recrystallization from ethanol, the product is obtained as bright lemon yellow crystals melting at 173–174° C.

Example 2

60 g. of 2-benzoyl-3,4,5,6-tetrachlorobenzamide, 140 ml. of sodium hypochlorite solution (assaying 16 percent active chlorine) and 38 g. of potassium hydroxide are added to 850 ml. of water. The stirred suspension is kept at 40° for 1 hour, then at 50° for 1 hour, then refluxed for a few minutes, and allowed to cool somewhat. 80 g. of potassium hydroxide and 80 ml. of water are then added and the resulting mixture heated to the boiling point. The mixture is then cooled to room temperature and the solid filtered off and washed with water. The crude 2-benzoyl-3,4,5,6-tetrachloroaniline melts over the range of 180–220° C. When heated to 160–180° C. at 0.1 mm. pressure, 5 g. of a yellow solid sublimes out. The sublimate melts at 173–177° C., and after a single recrystallization from acetic acid, melts at 174–175° C. This is identical in all properties with the 2-benzoyl-3,4,5,6-tetrachloroaniline obtained in Example 1.

I claim:
1. 2-benzoyl-3,4,5,6-tetrahaloaniline, wherein halo is chloro or bromo.
2. 2-benzoyol-3,4,5,6-tetrachloroaniline.

References Cited by the Examiner

UNITED STATES PATENTS

| | | | |
|---|---|---|---|
| 2,463,942 | 3/1949 | Behrens et al. | 260—558 |
| 2,490,835 | 12/1949 | Rieveschl et al. | 260—570 |
| 2,789,128 | 4/1957 | Tursich | 260—471 |
| 2,937,203 | 5/1960 | Fuller | 260—558 |
| 2,974,168 | 3/1961 | Sharp et al. | 260—570 |
| 3,051,701 | 8/1962 | Reeder et al. | 260—570 X |
| 3,059,021 | 10/1962 | Prill | 260—471 |

OTHER REFERENCES

Wagner et al., "Synthetic Organic Chemistry," pages 566, 645, 674, 678 (1953).

CHARLES B. PARKER, *Primary Examiner*.

LEON ZITVER, *Examiner*.